US012749281B2

(12) United States Patent
Jeong

(10) Patent No.: US 12,749,281 B2
(45) Date of Patent: Sep. 29, 2026

(54) METHOD AND APPARATUS FOR DETECTING CARGO IN CONTAINER IMAGE USING CONTAINER WALL BACKGROUND REMOVAL

(71) Applicant: ELECTRONICS AND TELECOMMUNICATIONS RESEARCH INSTITUTE, Daejeon (KR)

(72) Inventor: Ji Wook Jeong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 425 days.

(21) Appl. No.: 18/205,166

(22) Filed: Jun. 2, 2023

(65) Prior Publication Data

US 2023/0394779 A1 Dec. 7, 2023

(30) Foreign Application Priority Data

Jun. 7, 2022 (KR) ........................ 10-2022-0069013

(51) Int. Cl.
*G06V 10/26* (2022.01)
*G06V 10/32* (2022.01)
(Continued)

(52) U.S. Cl.
CPC ............ *G06V 10/273* (2022.01); *G06V 10/32* (2022.01); *G06V 10/751* (2022.01);
(Continued)

(58) Field of Classification Search
CPC .. G06V 10/273; G06V 10/7715; G06V 10/32; G06V 10/751; G06V 20/50; G06V 2201/05
See application file for complete search history.

(56) References Cited

U.S. PATENT DOCUMENTS 6,880,758 B2 4/2005 Park et al.
7,649,976 B2 1/2010 Georgeson et al.
(Continued)

FOREIGN PATENT DOCUMENTS

KR 10-1778503 B1 9/2017
KR 10-2325017 B1 11/2021

OTHER PUBLICATIONS

Zheng, Y., & Elmaghraby, A. (Jun. 2013). A vehicle threat detection system using correlation analysis and synthesized x-ray images. In Detection and Sensing of Mines, Explosive Objects, and Obscured Targets XVIII (vol. 8709, pp. 199-208). SPIE. (Year: 2013).*
(Continued)

*Primary Examiner* — David Perlman
(74) *Attorney, Agent, or Firm* — LRK PATENT LAW FIRM

(57) ABSTRACT

Provided are a method and apparatus for detecting cargo in a container image using container wall background removal. The method of detecting cargo in a container image according to an aspect of the present invention includes: receiving a backscatter X-ray target container image captured on a target container; acquiring a backscatter X-ray empty target container wall image of an empty container that corresponds to the target container and a capturing condition of the backscatter X-ray target container image; generating a difference image in which a wall background of the target container is removed based on the backscatter X-ray target container image and the backscatter X-ray empty target container wall image; and detecting cargo included in the target container based on the difference image.

18 Claims, 14 Drawing Sheets

(51) Int. Cl.
*G06V 10/75* (2022.01)
*G06V 10/77* (2022.01)
*G06V 20/50* (2022.01)

(52) U.S. Cl.
CPC .......... *G06V 10/7715* (2022.01); *G06V 20/50* (2022.01); *G06V 2201/05* (2022.01)

(56) References Cited

U.S. PATENT DOCUMENTS

| | | | | |
|---|---|---|---|---|
| 8,275,092 | B1 | 9/2012 | Zhang et al. | |
| 10,535,142 | B2 | 1/2020 | Kim et al. | |
| 2008/0095310 | A1* | 4/2008 | Edwards | G01N 23/203<br>378/57 |
| 2014/0270066 | A1* | 9/2014 | Magnuson | G01R 33/4812<br>378/62 |
| 2017/0160426 | A1* | 6/2017 | Li | G06V 20/00 |
| 2017/0357026 | A1* | 12/2017 | Gallagher | G01V 5/22 |

OTHER PUBLICATIONS

Final Office Action of the KR Patent Application No. 10-2022-0069013 dated Mar. 25, 2026.

* cited by examiner

METHOD AND APPARATUS FOR DETECTING CARGO IN CONTAINER IMAGE USING CONTAINER WALL BACKGROUND REMOVAL

CROSS-REFERENCE TO RELATED APPLICATION

This application claims priority to and the benefit of Korean Patent Application No. 10-2022-0069013, filed on Jun. 7, 2022, the disclosure of which is incorporated herein by reference in its entirety.

BACKGROUND

1. Field of the Invention

The present disclosure relates to a method and apparatus for detecting cargo in a container image, and more specifically, to a method and apparatus for detecting cargo in a container image, which are for detecting cargo in a backscatter X-ray container image using a container wall background removal technique.

2. Description of Related Art

X-ray transmission images commonly used to detect dangerous cargo among luggage and cargo, for example, an X-ray transmission image of a container, are captured in a situation in which a variety of cargo is distributed in multiple layers in the container, and are suitable for specifying and detecting dangerous cargo formed of a metal. On the other hand, an organic material having lower X-ray absorption than a metal due to transmission attenuation characteristics is not easily revealed when surrounded by layers of cargo formed of a metal and thus is not easily found.

Backscatter X-ray images collect signals that return from back-scattering from cargo that is distributed a certain distance from an X-ray source in a limited space, so that material distribution information close to two dimensions (2D) is collected, thereby acquiring a detection image in which discrimination is relatively easy and the surface of an object is directly reflected. Therefore, backscatter X-ray images have been widely researched and used recently. In particular, in the case of a security screening imaging device, such as a vehicle inspector (Z backscatter van, ZBV), the imaging device is mounted on a vehicle and transported to a container for cargo, such as a freight container, to be installed and then emits low-dose X-rays sideways toward the container, so that backscatter X-ray signals returning after reflection are imaged to acquire a backscatter image, and thus ZBV has been mainly used for detecting hidden cargo. In this case, since most container walls of containers on which cargo is loaded are formed of a metal material, signals reflected from the container wall and signals reflected from the cargo are combined in the backscattering, making it difficult to read with the naked eye, and in particular when a target to be detected is an organic material, it is more difficult to detect the target.

SUMMARY OF THE INVENTION

The present disclosure is directed to providing a method and apparatus for detecting cargo in a container image which are for detecting cargo in an X-ray container image using a container wall background removal technique.

The technical objectives of the present invention are not limited to the above, and other objectives may become apparent to those of ordinary skill in the art based on the following description.

According to an embodiment of the present disclosure, a method and apparatus for detecting cargo in a container image using container wall background removal are disclosed. According to an aspect of the present disclosure, there is provided a method of detecting cargo in a container image, the method including: receiving a backscatter X-ray target container image captured on a target container; acquiring a backscatter X-ray empty target container wall image of an empty container that corresponds to the target container and a capturing condition of the backscatter X-ray target container image; generating a difference image in which a wall background of the target container is removed based on the backscatter X-ray target container image and the backscatter X-ray empty target container wall image; and detecting cargo included in the target container based on the difference image.

The receiving may include additionally receiving the photographing condition including a geometric condition between the target container and an X-ray source and a geometric condition between the target container and an X-ray detector, and the acquiring of the backscatter X-ray empty target container wall image may include acquiring, as the backscatter X-ray empty target container wall image, an empty container wall image corresponding to information about the target container and the received capturing condition among empty container wall images that are pre-constructed for container information and each capturing condition.

The acquiring of the backscatter X-ray empty target container wall image may include extracting a feature point for the target container through the backscatter X-ray target container image, searching for empty container wall images corresponding to the information about the target container using the extracted feature point, and acquiring an empty container wall image corresponding to the capturing condition among the retrieved empty container wall images as the backscatter X-ray empty target container wall image.

The acquiring of the backscatter X-ray empty target container wall image may include acquiring information about the target container and the capturing condition using artificial intelligence of a pre-trained model that may use the backscatter X-ray target container image as an input, and acquiring the backscatter X-ray empty target container wall image corresponding to the information about the target container and the capturing condition.

The receiving may include receiving the backscatter X-ray target container image including the target container and a phantom installed in advance, the generating of the difference image may include correcting the backscatter X-ray target container image using image information of the phantom included in the backscatter X-ray target container image and image information of the phantom constructed in advance, and generating the difference image using the corrected backscatter X-ray target container image and the backscatter X-ray empty target container wall image.

The generating of the difference image may include correcting the backscatter X-ray target container image such that a brightness distribution of the phantom included in the backscatter X-ray target container image is the same as a brightness distribution of the phantom constructed in advance.

The phantom may be installed in a preset location of the target container or installed to be spaced apart from the target container.

The acquiring of the backscatter X-ray empty target container wall image may include, when the backscatter X-ray empty target container wall image corresponding to the target container and the capturing condition is not present, searching for at least two empty container wall images that are most similar to the target container and the capturing condition among empty container wall images that are pre-constructed for container information and each capturing condition, and generating and acquiring the backscatter X-ray empty target container wall image corresponding to the target container and the capturing condition using the at least two empty container wall images.

The receiving may include receiving a first backscatter X-ray target container image and a second backscatter X-ray target container image captured on the target container at a first wavelength and a second wavelength, respectively, the acquiring of the backscatter X-ray empty target container wall image may include acquiring a first backscatter X-ray empty target container wall image corresponding to the target container and a capturing condition of the first backscatter X-ray target container image, and a second backscatter X-ray empty target container wall image corresponding to the target container and a capturing condition of the second backscatter X-ray target container image, the generating of the difference image may include generating a first difference image of the first backscatter X-ray target container image and the first backscatter X-ray empty target container wall image and a second difference image of the second backscatter X-ray target container image and the second backscatter X-ray empty target container wall image, and the detecting of the cargo may include detecting the cargo based on the first difference image and the second difference image.

The receiving may include receiving a first backscatter X-ray target container image and a second backscatter X-ray target container image captured on the target container at a first wavelength and a second wavelength, respectively, the acquiring of the backscatter X-ray empty target container wall image may include generating a third backscatter X-ray target container image of a third wavelength that is closest to the first wavelength and the second wavelength based on the first backscatter X-ray target container image and the second backscatter X-ray target container image, and acquiring a third backscatter X-ray empty target container wall image corresponding to the target container and a capturing condition including the third wavelength among pre-constructed empty container wall images, the generating of the difference image may include generating a third difference image of the third backscatter X-ray target container image and the third backscatter X-ray empty target container wall image, and the detecting of the cargo may include detecting the cargo based on the third difference image.

According to another aspect of the present disclosure, there is provided a method of detecting cargo in a container image, the method including: receiving a backscatter X-ray target container image captured on a target container and a phantom installed at a preset location; acquiring a backscatter X-ray empty target container wall image of an empty container that corresponds to the target container, the phantom, and a capturing condition of the backscatter X-ray target container image; correcting the backscatter X-ray empty target container wall image using image information of the phantom included in the backscatter X-ray target container image and image information of the phantom included in the backscatter X-ray empty target container wall image; generating a difference image, in which a wall background of the target container is removed, using the backscatter X-ray target container image and the corrected backscatter X-ray empty target container wall image; and detecting cargo included in the target container based on the difference image.

According to another aspect of the present disclosure, there is provided an apparatus for detecting cargo in a container image, the apparatus including: a receiving unit configured to receive a backscatter X-ray target container image captured on a target container; an acquisition unit configured to acquire a backscatter X-ray empty target container wall image of an empty container that corresponds to the target container and a capturing condition of the backscatter X-ray target container image; a generation unit configured to generate a difference image in which a wall background of the target container is removed based on the backscatter X-ray target container image and the backscatter X-ray empty target container wall image; and a detection unit configured to detect cargo included in the target container based on the difference image.

The features briefly summarized above for this disclosure are only exemplary aspects of the detailed description of the disclosure which follows, and are not intended to limit the scope of the disclosure.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
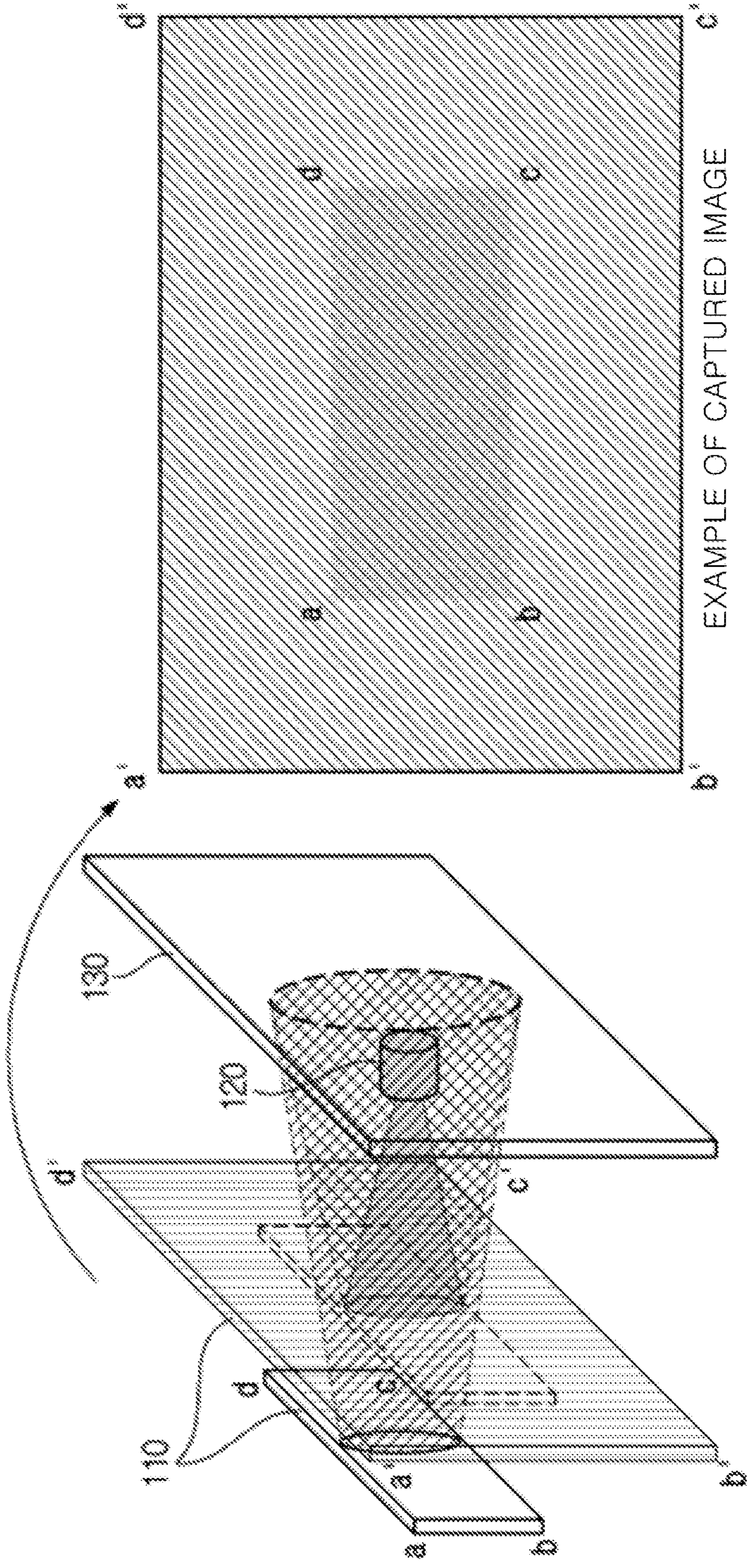
FIG. 1 is an exemplary view for describing a system for capturing a backscatter X-ray image.

Hereinafter, exemplary embodiments of the present disclosure will be described in detail with reference to the accompanying drawings so that those skilled in the art may easily implement the present disclosure. As those skilled in the art would realize, the described embodiments may be modified in various different ways, without departing from the spirit or scope of the present invention.

In the following description of embodiments of the present disclosure, when it is determined that a detailed description of a known structure or function may obscure the subject matter of the present disclosure, the detailed description will be omitted. In the drawings, parts irrelevant to the description of the present disclosure are omitted, and like reference numerals designate like parts.

In the present disclosure, when a component is "connected," "coupled" or "connected" with another component, it may be not only a direct connection, but also an indirect connection in which another component exists in the middle of the connection. In addition, when a component "includes" or "has" another component, it means that it may further include another component, without excluding other components, unless specifically stated otherwise.

In the present disclosure, terms such as "first" and "second" are used only for the purpose of distinguishing one component from other components, and do not limit the order or the importance between the components unless specifically mentioned. Accordingly, within the scope of the present disclosure, a first component in one embodiment may be referred to as a second component in another embodiment, and likewise, a second component in one embodiment may be referred to as a first component in another embodiment.

In the present disclosure, the components are distinguished from each other in order to clearly describe each feature, and this does not necessarily mean that the components are separated. That is, a plurality of components may be integrated into one hardware or software unit, or one component may be distributed and formed into a plurality of hardware or software units. Therefore, if not mentioned otherwise, such integrated or distributed embodiments are included in the scope of the present disclosure.

In the present disclosure, components described in various embodiments are not necessarily required components, and some may be optional components. Therefore, an embodiment composed of a subset of components described in an embodiment is also included in the scope of the present disclosure. In addition, embodiments including other components in addition to the components described in the various embodiments are included in the scope of the present disclosure.

In the present disclosure, expressions of positional relationships "upper," "lower," "left," "right," etc. are described for convenience of description, and when viewing the drawings shown in the specification in reverse, the positional relations described in the specification may also be interpreted in reverse.

In the field of customs security inspection at border crossings, which involves handling a variety of target cargo, from detecting dangerous cargo such as smuggled weapons to detecting organic cargo such as hidden agricultural products and drug seizures, the efficiency and accuracy of reading hidden cargo and dangerous cargo should be increased, so there is a need for a method of effectively removing signals coming from a container wall background area other than an object at a border customs site and generating an image that ensures relatively easy detection.

In addition, in the case of generating a difference image between X-ray transmission images according to the related art, background pixel values are removed by performing correction in consideration of all attenuation coefficients of materials that an optical axis passes through, whereas in the case of a backscatter X-ray image, both X-rays backscattered from cargo and X-rays backscattered from a container wall reach an X-ray sensor, and thus a backscatter X-ray image with a shadow of the container wall removed may be easily obtained by removing backscatter signals collected in advance under the specifications of the container wall and the incident conditions that are recognized in advance.

Embodiments of the present disclosure aim to easily detect cargo in a container, for example, hidden cargo, by removing a background including a shadow of a container wall from a backscatter X-ray image of a container containing cargo.

Embodiments of the present disclosure may, from backscatter X-ray empty container wall images that are pre-constructed according to specifications or information of containers and capturing conditions of backscatter X-ray images, acquire a backscatter X-ray empty container wall image corresponding to information of a target container and a capturing condition, and remove a wall background of the target container from a corresponding backscatter X-ray target container image using the corresponding backscatter X-ray empty container wall image, thereby detecting cargo included in the target container.

Furthermore, embodiments of the present disclosure may correct a backscatter X-ray target container image using image information about at least one phantom pre-installed when constructing a backscatter X-ray empty container wall image and image information about at least one phantom included in a backscatter X-ray target container image, thereby clearly removing a wall background of a target container from the backscatter X-ray target container image.

In this case, embodiments of the present disclosure may store image information (hereinafter referred to as "phantom reference image information") standardized or normalized for at least one phantom, and may normalize pre-constructed empty container wall images or a difference image using the phantom reference image information.

Hereinafter, in the detailed description of the present disclosure, a backscatter X-ray target container image is referred to as a target container image, and a backscatter X-ray empty target container wall image is referred to as an empty target container wall image.

FIG. 1 is an exemplary view for describing a system for capturing a backscatter X-ray image. Referring to FIG. 1, a backscatter X-ray apparatus may emit X-rays from an X-ray source 120 to a container, and detect X-rays (or radiation) reflected from a container wall 110 using a backscattering X-ray detector 130 to capture a backscatter X-ray container image of the corresponding container.

In the embodiments of the present disclosure, a target container image of a target container for which cargo is to be detected is captured by a backscatter X-ray apparatus, the captured target container image is received, and a difference image between the captured target container image and a pre-constructed empty target container wall image is generated, so that the cargo loaded in the target container may be easily detected through the difference image.

A method and apparatus according to an embodiment of the present disclosure will be described with reference to FIGS. 2 to 8.

Figure 2:
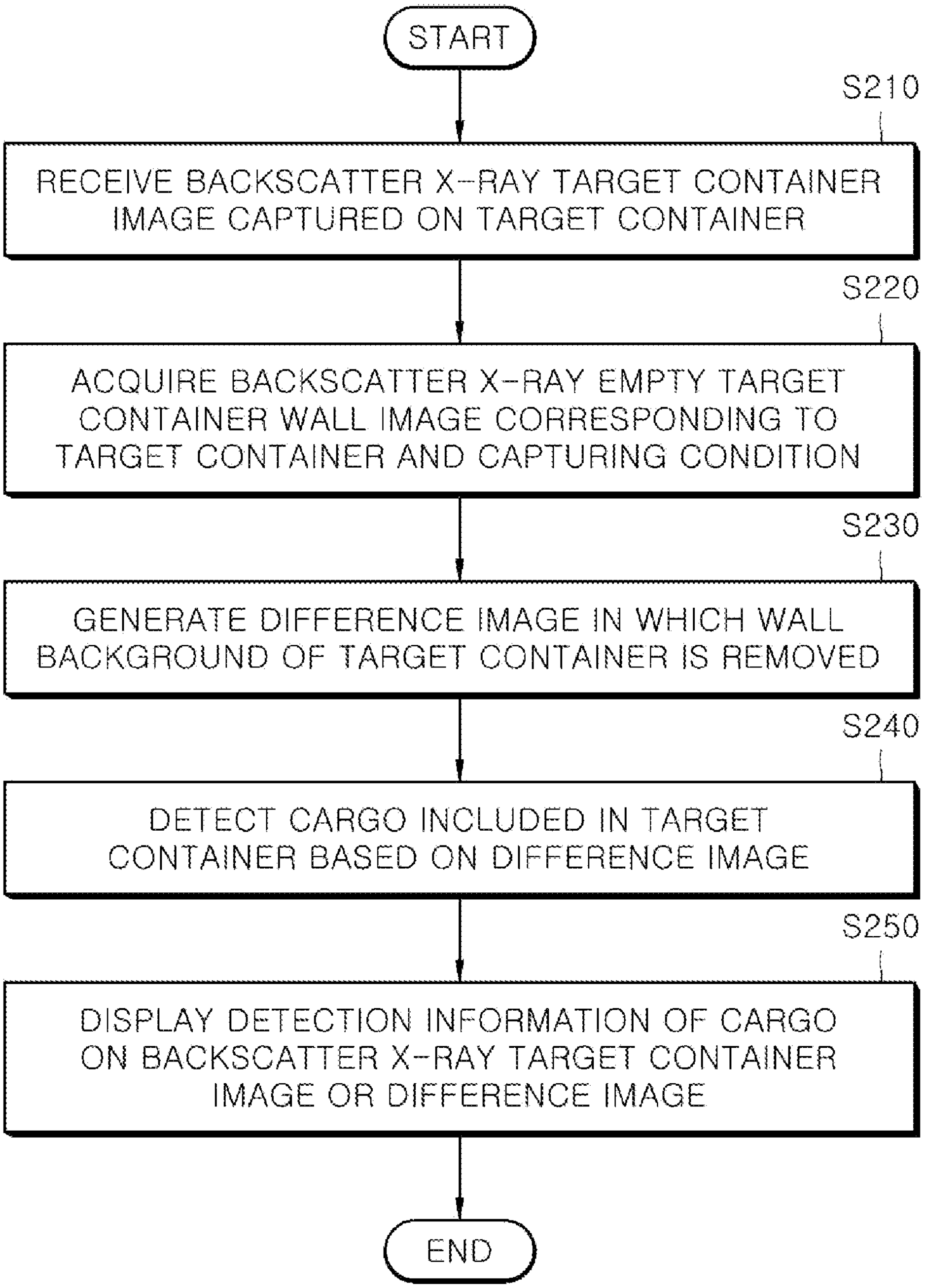
FIG. 2 is a flowchart showing a method of detecting cargo in a backscatter X-ray container image according to an embodiment of the present disclosure.

FIG. 2 is a flowchart showing a method of detecting cargo in a backscatter X-ray container image according to an embodiment of the present disclosure.

Referring to FIG. 2, a method of detecting cargo in a backscatter X-ray container image according to an embodiment of the present disclosure includes receiving a target container image (a backscatter X-ray target container image) captured on a target container by a backscatter X-ray apparatus (S210), and acquiring an empty target container wall image (a backscatter X-ray empty target container wall image) that corresponds to the target container and a capturing condition of capturing the target container image (S220).

In this case, in operation S210, the target container image may be received from the backscatter X-ray apparatus by capturing a backscatter X-ray image on the entire wall surface of the target container based on pre-input specifications under an orthogonal incident condition.

Here, the capturing condition may include geometric conditions between the X-ray source and the target container and geometric conditions between the target container and the X-ray detector (a backscattering X-ray detector), and may further include target container information including a size of the target container, a material of the target container, X-ray energy, an X-ray wavelength, and the like.

The capturing conditions may be set in advance when capturing the target container image, and the capturing conditions may be received together at the same time as receiving of the target container image. Although the capturing conditions may be received together at the same time as the receiving of the target container image, they are not limited or restricted thereto, and the capturing conditions may be acquired using artificial intelligence of a pre-trained learning model that takes the received target container image as an input to detect the capturing conditions including information of the target container, a geometric condition between the X-ray source and the target container, and a geometric condition between the target container and the backscattering X-ray detector from the target container image.

Figure 3A:
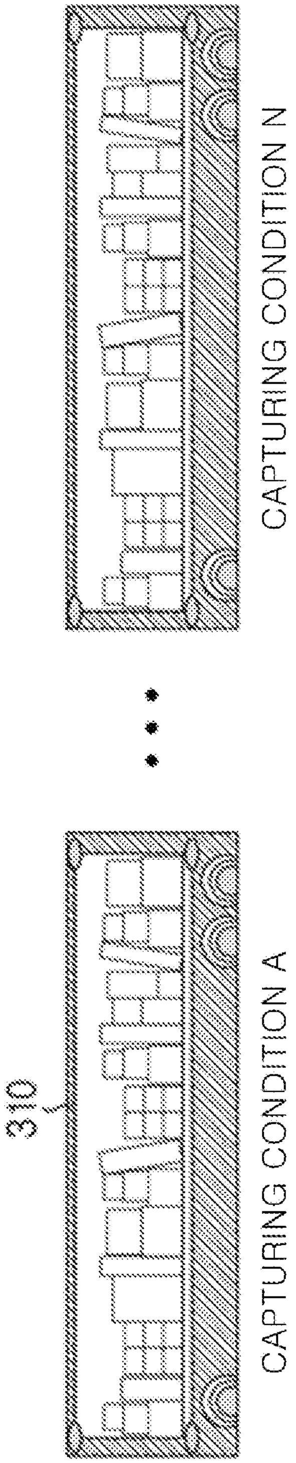
FIGS. 3A to 3C are exemplary views for describing a process of selecting a backscatter X-ray empty target container wall image according to a capturing condition of a target container.
Figure 3B:
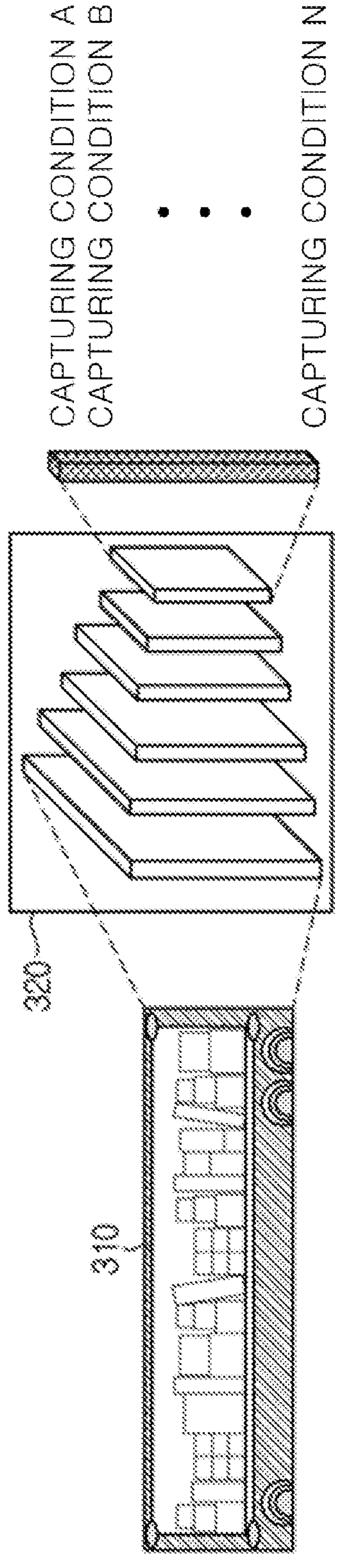
Figure 3C:
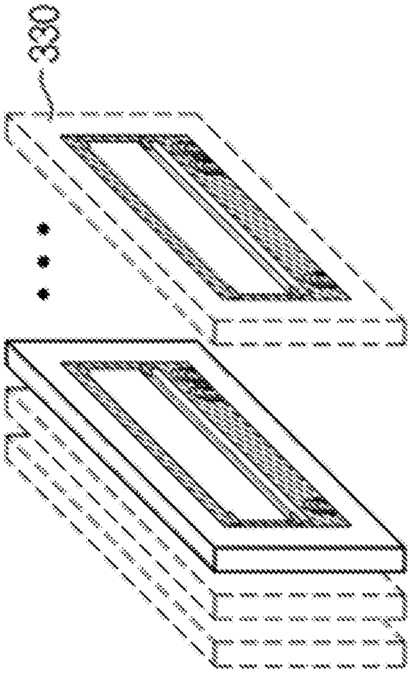
Figure 4A:
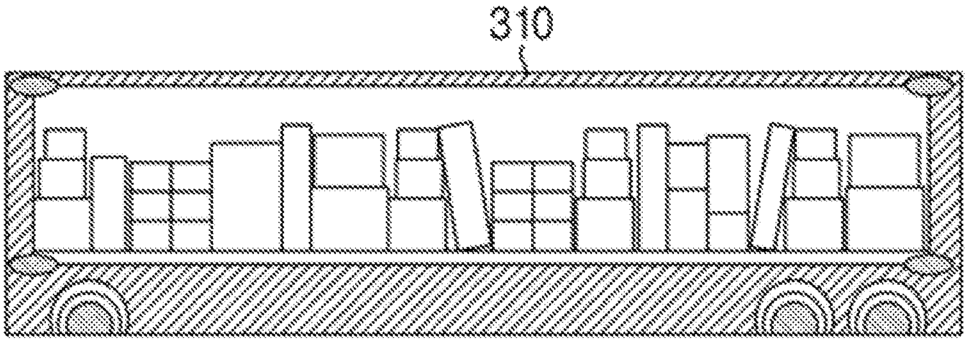
FIGS. 4A to 4C are exemplary views for describing a process of generating a difference image.
Figure 4B:
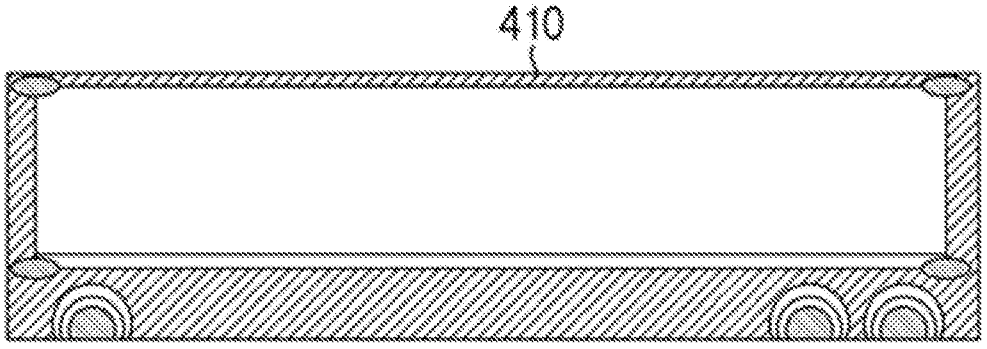
Figure 4C:
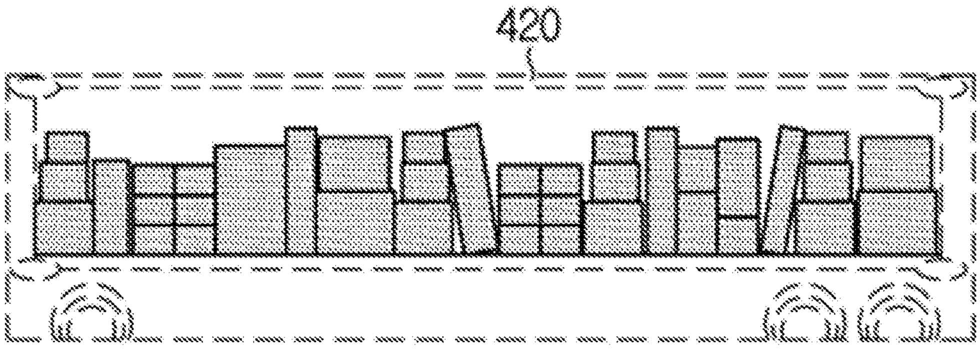

According to an embodiment, as shown in FIGS. 3A to 3C, when capturing conditions for capturing target container images range from capturing condition A to capturing condition N (see FIG. 3A), and a target container image 310 captured under the capturing condition A is received, an artificial intelligence 320 of a pre-trained learning model may be used to acquire specifications of a target container wall, a relative geometric condition between the target container wall and the X-ray source, and a relative relation between the target container wall and the backscattering X-ray detector, that is, the capturing condition A from the target container image 310 (see FIG. 3B), and then, among empty container wall images pre-constructed according to the capturing conditions (e.g., the capturing condition A to the capturing condition N) and container specifications (e.g., container wall specifications), acquire an empty container wall image corresponding to the specification of the target container wall and the capturing condition A as an empty target container wall image. In this case, the artificial intelligence 320 of the learning model may train the learning model using pre-collected training data and verify the learning model using verification data.

According to another embodiment, in operation S210, a capturing condition including a relative geometric condition between the target container wall and the X-ray source and a relative geometric condition between the target container wall and the backscattering X-ray detector may be received, and in operation S220, the target container image may be analyzed to extract feature points of the wall of the target container to search for empty container wall images corresponding to a wall specification of the target container using the extracted feature points, and then an empty container wall image corresponding to the capturing condition among the retrieved empty container wall images may be acquired as an empty target container wall image.

In the embodiments of the present disclosure, a method of acquiring an empty target container wall image is not limited or restricted to the above method, and the empty target container wall image may be acquired using any method applicable to the method of the present disclosure.

When the empty target container wall image is acquired in operation S220, a difference image in which a wall background of the target container is removed is generated using the target container image and the empty target container wall image (S230).

In this case, in operation S230, the empty target container wall image may be removed from the target container image through a pixel value difference between the target container image and the empty target container wall image, thereby generating the difference image in which the wall background of the target container is removed.

For example, in operation S230, through a difference in pixel values between a target container image 310 (see FIG. 4A) and an empty target container wall image 410 (see FIG. 4B) acquired in operation S220, a difference image 420 (FIG. 4C) in which a wall background of the target container is removed may be acquired.

In this case, the difference image may be generated with a difference in pixel values between the target container image and the empty target container wall image, which is achieved using X-ray characteristics of backscattering X-rays on multiple paths that are reflected from a material in paths and accumulated in an X-ray detector. That is, in operation S230, the difference image may be generated by acquiring a difference in pixel values between the two images.

When the difference image in which the wall background of the target container is removed is generated in operation S230, cargo included in the target container, for example, hidden cargo, is detected based on the difference image (S240), and detection information of the cargo, for example, the location and type of the cargo, are displayed on the target container image or the difference image (S250).

In this case, in operation S240, the type of the cargo, for example, metal, an inorganic material, an organic material, and the like, and the location of the cargo may be detected from the difference image using a pre-trained learning model for detecting the type and location of cargo, and in operation S250, the detection information detected as described above may be transmitted to a display screen, so that the detection information may be displayed on the target container image or the difference image. In operations S240 and S250, not only hidden cargo but also all types and forms of cargo specifiable from images may be detected and displayed.

The learning model used in the embodiments of the present disclosure may be provided using all types of applicable artificial intelligence, such as a deep neural network (DNN), a convolutional neural network (CNN), a recursive neural network (RNN), and the like, and since methods of training the artificial intelligence are obvious to those skilled in the art, description thereof is omitted.

Figure 5:
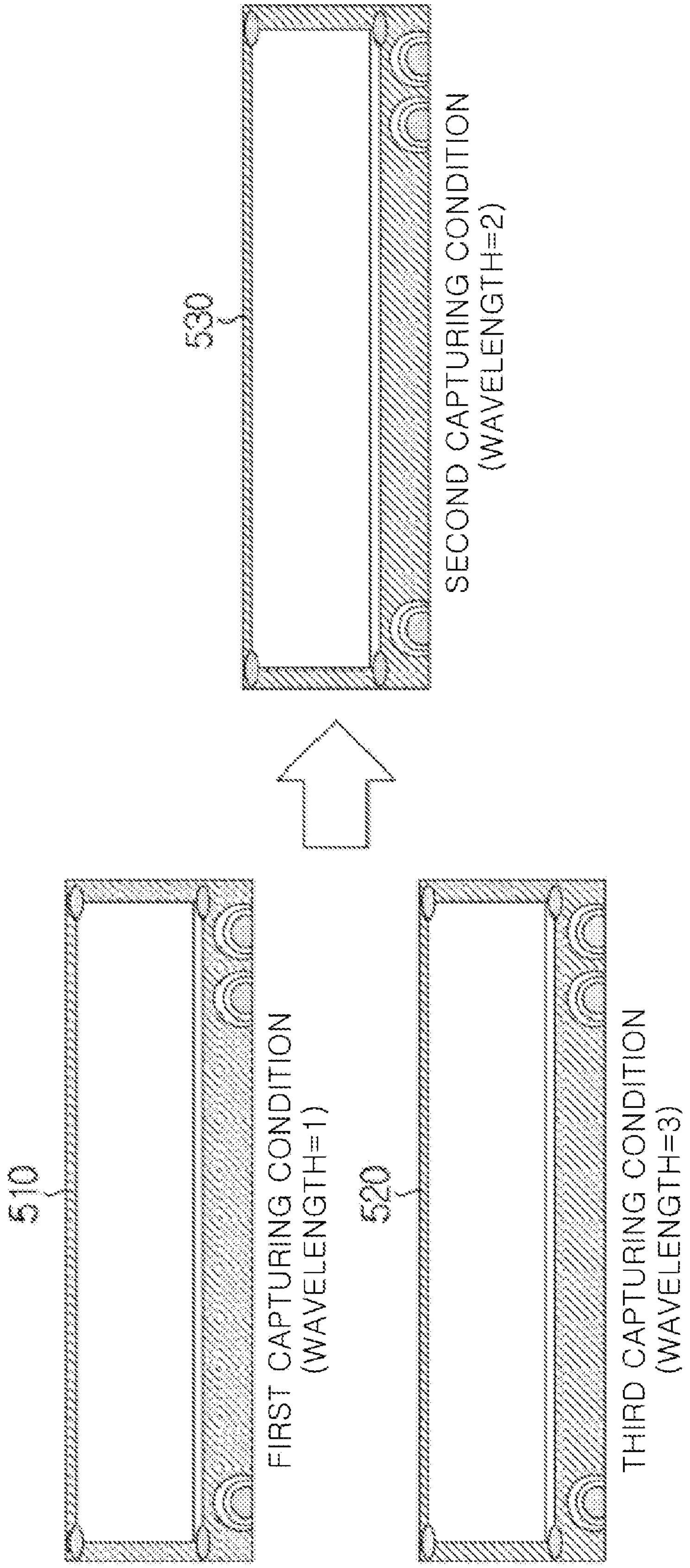
FIG. 5 is an exemplary view for describing a process of acquiring a backscatter X-ray empty target container wall image under a specific capturing condition.

Furthermore, in the method according to an embodiment of the present disclosure, a geometric condition, a wavelength, a spatial resolution, and the like may not exactly match between the target container image and the empty container wall image. In this case, an empty container wall image corresponding to the target container image may be generated using the pre-constructed empty container wall images. For example, as shown in FIG. 5, when a target container image is captured under a capturing condition (a second capturing condition) including a second wavelength, but there is no empty container wall image having information about an empty target container and corresponding to the capturing condition (the second capturing condition) of the second wavelength among pre-constructed empty container wall images, an empty target container wall image 530 corresponding to the capturing condition (the second capturing condition) of the second wavelength may be generated using an empty container wall image (an empty target container wall image) 510 corresponding to a capturing condition (the first capturing condition) of a first wavelength close to the second wavelength and an empty container wall image 520 corresponding to a capturing condition (the third capturing condition) of a third wavelength close to the second wavelength. In this case, the empty target container wall image 530 corresponding to the second capturing condition may be generated using a linear or non-linear regression method. Although the generation of an empty target container wall image is described based on only a wavelength difference in FIG. 5, a method according to an embodiment of the present disclosure may include, even when a spatial resolution and the like as well as the wavelength is different, generating a corresponding empty target container wall image through the method described above.

In addition, in a method according to the embodiment of the present disclosure, when the X-ray source can emit X-rays of at least two different wavelengths to the target container rather than emitting X-rays of only one wavelength, target container images of the at least two different wavelengths, for example, a first target container image and a second target container image, may be received. In this case, the method according to the embodiment of the present disclosure may include, upon receiving a first target container image and a second target container image captured at the first wavelength and the second wavelength, respectively, acquiring a first empty target container wall image corresponding to information about the target container, such as a specification of the target container, and a capturing condition of the first target container image, and a second empty target container wall image corresponding to information about the target container, such as a specification of the target container, and a capturing condition of the second target container image, and generate a difference image (e.g., a first difference image) between the first target container image and the first empty target container wall image and a difference image (e.g., a second difference image) between the second target container image and the second empty target container wall image, so that cargo in the target container may be detected using the first difference image and the second difference image. According to an embodiment, the method of the present disclosure may include comparing and analyzing detection information of cargo detected by the first difference image and detection information of cargo detected by the second difference image, to acquire final detection information of the cargo in the target container. Alternatively, the present disclosure may acquire an average image of the first difference image and the secondary difference image and acquire detection information of the cargo in the target container using the average image. Such methods correspond to a case in which the first empty target container wall image and the second empty target container wall image are present in the pre-constructed database. However, the corresponding empty target container wall images may not be present in the database, and in this case, according to a method (1), empty target container wall images each corresponding to a respective one of the first target container image and the second target container image may be generated, and according to a method (2), a target container image corresponding to a pre-constructed empty target container wall image may be generated using the first target container image and the second target container image. Here, the method (1) may include generating the empty target container wall image through the method described in FIG. 5, and the method (2) will be described with reference to FIG. 6.

Figure 6:
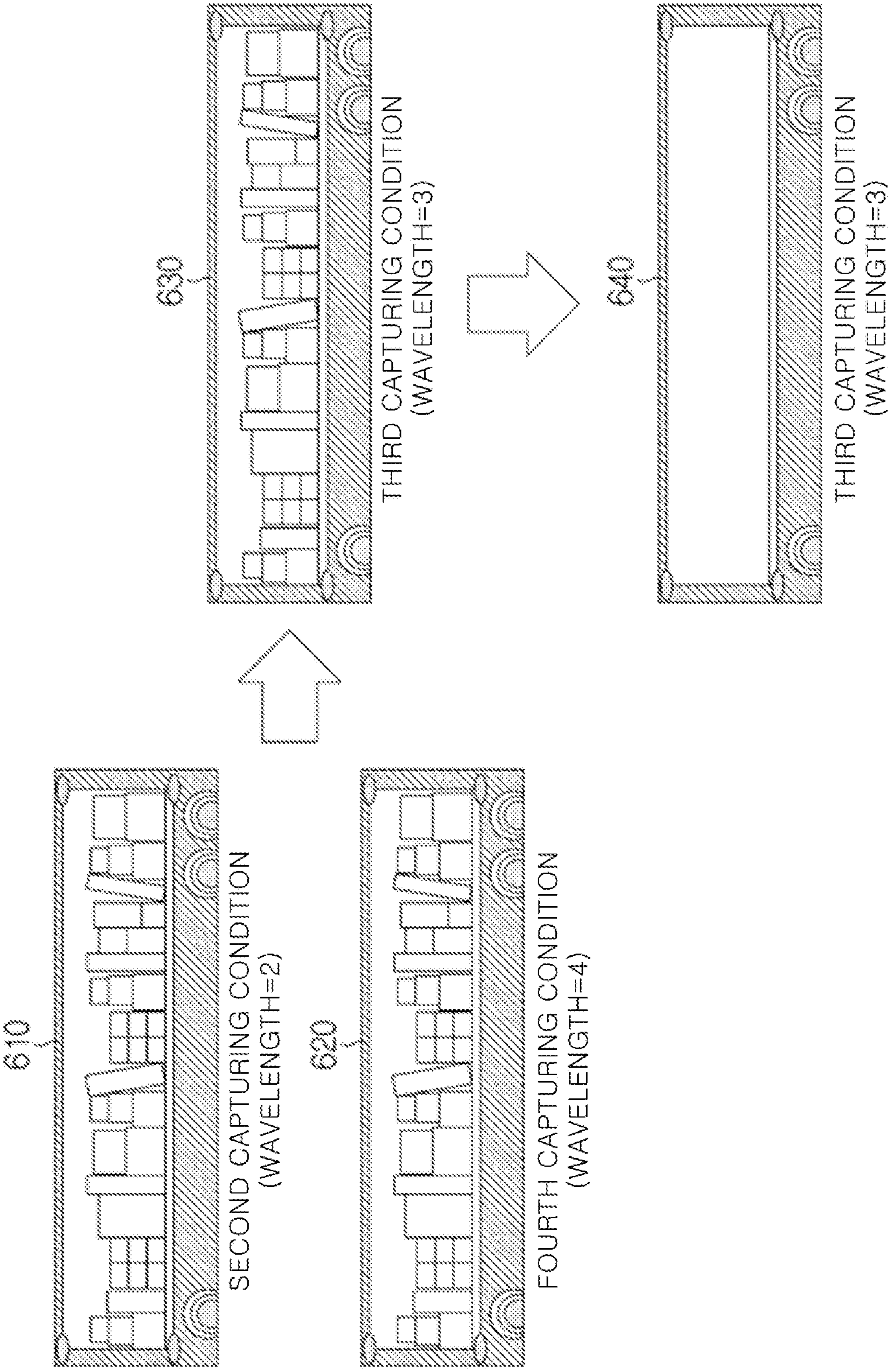
FIG. 6 is an exemplary view for describing a process of acquiring a backscatter X-ray empty target container wall image using backscatter X-ray target container images of two wavelengths.

FIG. 6 is an exemplary view for describing a process of acquiring a backscatter X-ray empty target container wall image using backscatter X-ray target container images of two wavelengths.

Referring to FIG. 6, in a method according to an embodiment of the present disclosure, when target container images captured on a target container under a capturing condition (a second capturing condition) of a second wavelength and a capturing condition (a fourth capturing condition) of a fourth wavelength, respectively, that is, a second target container image 610 and a fourth target container image 620, are received, based on determining that there is no empty target container wall image of the second capturing condition of the target container or empty target container wall image of the fourth capturing condition of the target container but that there is an empty target container wall image of a capturing condition (a third capturing condition) of a third wavelength, a third target container image 630, which is a target container image corresponding to the third capturing condition, is generated using the second target container image 610 and the fourth target container image 620. Upon the third target container image 630 being generated, the third empty target container wall image 640, which is an empty target container wall image of the third capturing condition corresponding to the third target container image 630, may be acquired, so that cargo in the target container may be detected through a difference image between the third target container image 630 and the third empty target container wall image 640.

As described above, the method according to the embodiment of the present disclosure may be used not only when there is a pre-constructed empty target container wall image corresponding to information about the target container, such as a specification of the target container, and the like, and a capturing condition, such as a relative geometric condition between the target container wall and the X-ray source, a relative geometric condition between the target container wall and the X-ray detector, a wavelength of the X-ray source, and the like, but also when there is no pre-constructed empty target container wall image corresponding to information about the target container and the capturing condition. The various techniques described above may be used to clearly remove the wall background of the target container from the target container image, and may resolve various issues that may be caused by the wall background through the removal of the wall background, and thus cargo inside the target container may be clearly detected.

On the other hand, even when the same target container is captured under the same capturing condition, there may be a difference in pixel values between empty container wall images pre-constructed according to container information and capturing conditions and a target container image captured in an actual field due to the surrounding environment and the like. Therefore, in order to remove this factor, a method according to an embodiment of the present disclosure may include performing correction, for example, calibration, on a target container image captured in practice and a pre-constructed empty container wall image using a phantom, to resolve issues caused by an environmental difference, such as an issue of a difference in pixel values of the same object in the target container image and the empty container wall image.

Depending on the embodiment, the phantom for calibration may take a form in which a plurality of material samples having the same thickness are perpendicular to the axis of the source and the detector, which do not overlap, and arranged on a plane parallel to the axis. In this case, when the phantom is formed of a plurality of materials, the phantom may include various materials that represent various reflection characteristics, such as various steels or non-ferrous metals used as materials for the container. The phantom may be installed at a location that does not overlap a container area, and when the phantom needs to be installed at a location that overlaps the container area, the phantom may be installed at a location in which cargo is not placed, for example, between a container wall and an X-ray source. The phantom may be captured while installed at a predefined geometric position. Further, the phantom for calibration may be installed at a specific location of the container, but it is not limited thereto, and the phantom may be installed at a preset location spaced a predetermined interval from the container.

Figure 7A:
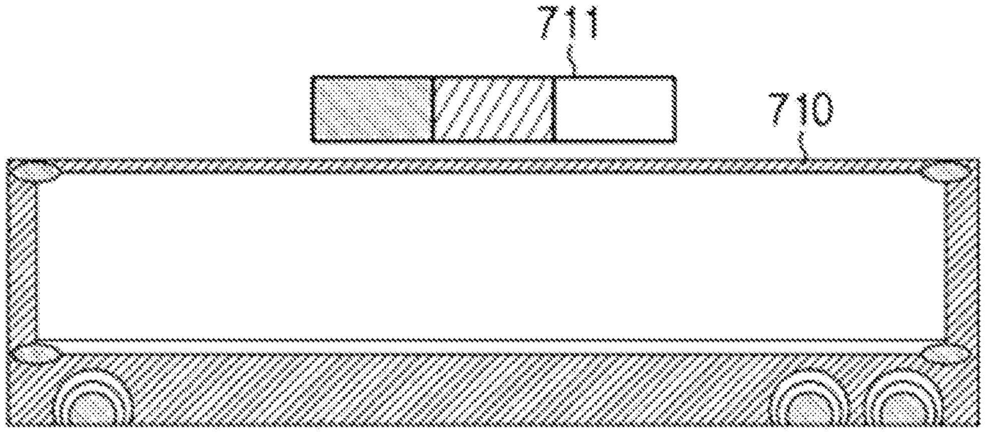
FIGS. 7A and 7B are exemplary views for describing a process of correcting a backscatter X-ray image using image information of a phantom.
Figure 7B:
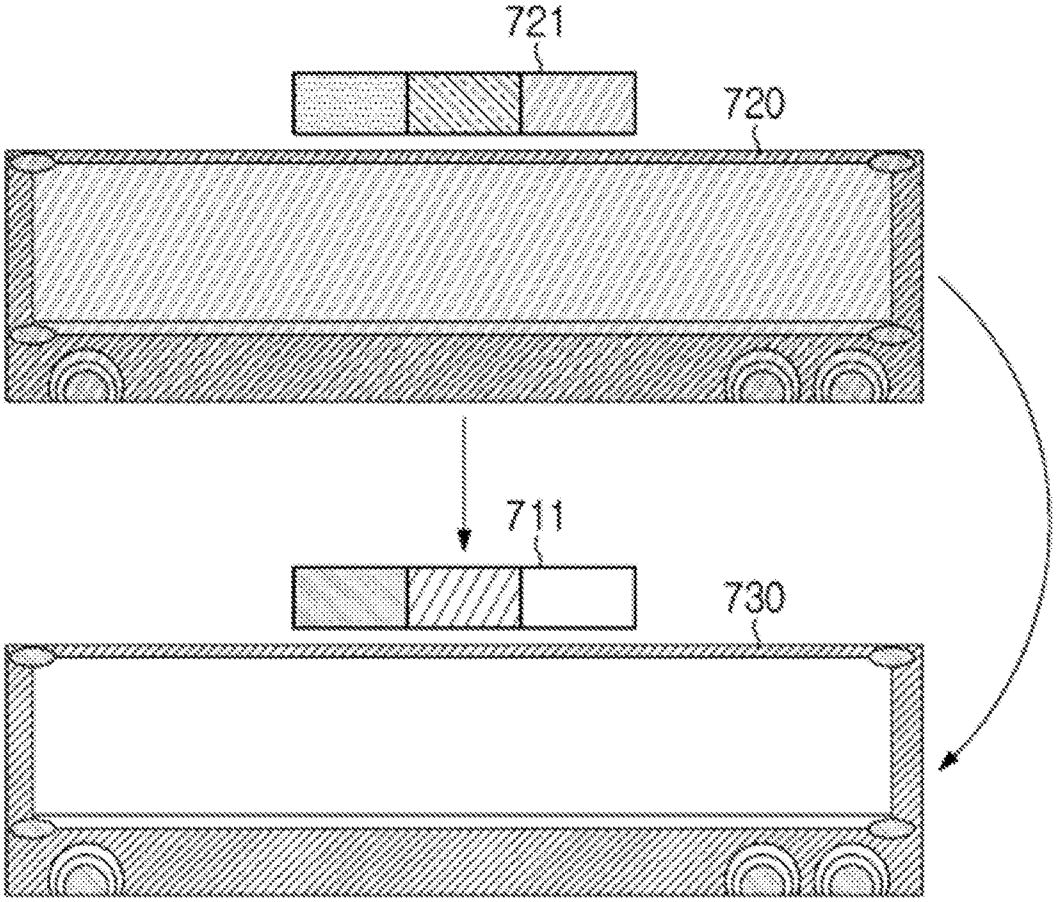

FIGS. 7A and 7B are exemplary views for describing a process of correcting a backscatter X-ray image using image information of a phantom. FIG. 7A is a view illustrating a standard empty container wall image, and FIG. 7B is a view illustrating a process in which an empty container wall image constructed in a database is calibrated based on a standard empty container wall image.

Referring to FIG. 7A, a standard empty container wall image 710 may include phantom image information 711 for correction (or calibration), and an empty container to be captured may be provided with a phantom of the same shape and the same material at the same location as the phantom of the standard empty container wall image and thus an empty container wall image 721 may be acquired as shown in FIG. 7B, and phantom image information 721 of the empty container wall image 720 acquired as described above may be compared with the phantom image information 711 of the standard empty container wall image 710 shown in FIG. 7A so that the captured empty container wall image 720 may be corrected to have the same brightness distribution as that of the standard phantom image information 711, thereby acquiring an empty container wall image 730 including the corrected phantom image information 711. With such a configuration, each of the empty container wall images may be provided with the same brightness distribution of the phantom image area as that of the standard empty container wall image, so that a database of empty container wall images may be constructed.

Although each image may be corrected through the above-described process, it is not limited or restricted thereto, and phantom image areas included in each of the target container image and the empty target container wall image may be compared, and correction may be performed on one of the target container image and the empty target container wall image, for example, the target container image, such that the brightness distributions of the two phantom image areas become the same, so that a difference image between the corrected target container image and the empty target container wall image may be clearly generated, and cargo inside the target container may be detected using the difference image. For example, in the process of correction, a color conversion formula may be determined through linear or nonlinear regression such that the two phantom image areas have statistically the same distribution of brightness, and the formula may be applied to the target container image, thereby correcting the target container image.

In this case, when the difference image is input to artificial intelligence of a pre-trained learning model, the difference image may be normalized through pre-processing before being input to the learning model so that the cargo in the target container may be detected by the learning model through the normalized difference image.

According to an embodiment, when the database is built in a state in which each of the empty container wall images is corrected by the standard empty container wall image as shown in FIG. 7B, the target container image may be corrected to have the same brightness distribution of the phantom image area as that of the empty target container wall image, and a difference image between the corrected target container image and the empty target container wall image may be input to the learning model without a need for normalization so that cargo in the target container may be detected through the difference image.

In an embodiment of the present disclosure, a technique for correcting a target container image using a phantom image area is not limited or restricted to the above, and various techniques capable of correcting using a phantom image area may be applicable.

In an embodiment of the present disclosure, the empty container wall images may be captured by a combination of a non-moving X-ray source and a moving X-ray detector or may be captured by a combination of a moving X-ray source and a moving X-ray detector when constructing an empty container wall image database. In this case, when constructing empty container wall images, the empty container wall images may be constructed by considering the statistics of capturing conditions collected in the field, to cover the distance from the container, the height from the ground, and the slope of the container in various ways, or may be constructed using X-rays of different wavelengths by reflecting various capturing conditions in the field, or may be constructed using X-ray detectors of various spatial resolutions. Furthermore, when capturing empty container wall images, a pre-designed phantom may be installed at a specific location of an empty container to acquire an empty container wall image including a phantom image, by which an empty container wall image including phantom image information for calibration may be added to a database. Here, the phantom image included in the empty container wall image may be an image of a phantom having the same reflective material and shape as a phantom installed in an actual target container, and the shape and material of the phantom may be designed and determined by the business or individuals providing the technology according to the present disclosure.

Furthermore, a method according to an embodiment of the present disclosure may include removing noise included in an image using a noise removal algorithm for removing various types of noise that may occur during X-ray imaging, such as grid noise between an X-ray source and an X-ray detector.

In addition, in a method according to an embodiment of the present disclosure, a method of comparing a geometric condition of a target container image and a geometric condition of an empty container wall image may include comparing a geometric condition corresponding to a key-point inferred from a target container image in a one-to-one manner against a specific geometric condition of an empty container wall image, directly comparing a combination of key-points inferred from an empty container wall image and a combination of key-points inferred from a target container image, comparing a geometric condition corresponding to a key-point inferred from an empty container wall image in a one-to-one manner against a specific geometric condition of a target container image, and directly comparing a geometric condition of an empty container wall image and a geometric condition of a target container image, and at least one of the above methods may be selected according to conditions of border search sites and database construction conditions.

According to an embodiment, in the method according to the embodiment of the present disclosure, when a plurality of container images are captured by a plurality of X-ray source-detector pairs installed at a plurality of angles, empty container wall images for the plurality of angles may also be constructed in a database. In this case, a plurality of phantoms need to be installed so as not to overlap a container area under each capturing condition both in the target container capturing and the empty container capturing.

As described above, the method according to the embodiment of the present disclosure may include removing a background including the shadow of a container wall from a backscatter X-ray image of a container containing cargo, thereby easily detecting the cargo in the container, for example, hidden cargo. At the actual border surveillance site, it is impossible to remove all the loaded cargo in a container and capture an image of the empty container wall. On the other hand, a backscatter X-ray image acquired by reflection from a steel container box having a non-simple pattern is added to the existing cargo image, increasing the detection difficulty. The method according to an embodiment of the present disclosure may include removing patterns of only the container as much as possible from the inspection image, which allows focusing on a cargo loading situation, facilitating detection of not only metal-containing dangerous cargo, such as firearms and knives, but also hidden cargo including smuggled agricultural products, drugs, and the like and also facilitating prevention of illegal entry, contributing to the health and safety of the public.

Figure 8:
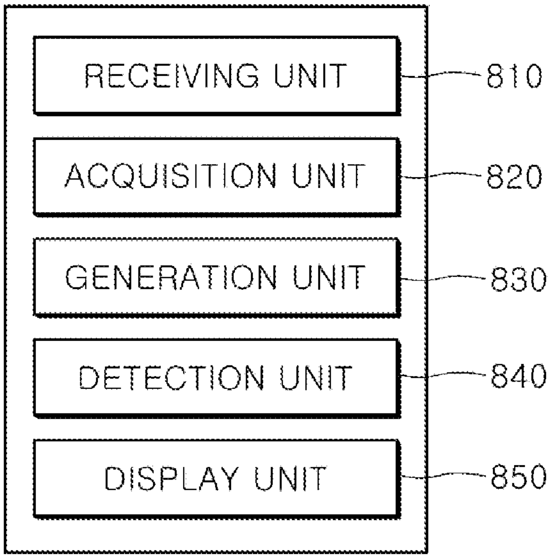
FIG. 8 is a block diagram illustrating a configuration of an apparatus for detecting cargo in a backscatter X-ray container image according to another embodiment of the present disclosure.

FIG. 8 is a block diagram illustrating a configuration of an apparatus for detecting cargo in a backscatter X-ray container image according to another embodiment of the present disclosure, that is, a configuration of an apparatus performing the method shown in FIGS. 1 to 7.

Referring to FIG. 8, an apparatus 800 for detecting cargo in a backscatter X-ray container image according to another embodiment of the present disclosure includes a receiving unit 810, an acquisition unit 820, a generation unit 830, a detection unit 840, and a display unit 850.

The receiving unit 810 receives a target container image captured for a target container.

In this case, the receiving unit 810 may additionally receive a capturing condition including a geometric condition between the target container and an X-ray source and a geometric condition between the target container and an X-ray detector.

Here, the target container image may be a backscatter X-ray image including the target container and a phantom installed in advance.

Furthermore, the receiving unit 810 may receive a first target container image and a second target container image captured at a first wavelength and a second wavelength, respectively, on the target container. This is for a case in which a backscattering X-ray apparatus emits different X-ray wavelengths, and target container images of different wavelengths according to the different X-ray wavelengths may be received from the backscattering X-ray apparatus.

The acquisition unit 820 acquires an empty target container wall image corresponding to the target container and the capturing condition of the target container image.

In this case, the acquisition unit 820 may acquire, as the backscatter X-ray empty target container wall image, an empty container wall image corresponding to information about the target container and the capturing condition among empty container wall images that are pre-constructed for container information and each capturing condition.

In this case, the acquisition unit 820 may extract a feature point for the target container through the target container image, search for empty container wall images corresponding to the information about the target container using the extracted feature point, and acquire an empty container wall image corresponding to the capturing condition among the retrieved empty container wall images as the empty target container wall image.

In this case, the acquisition unit 820 may acquire information about the target container and the capturing condition using artificial intelligence of a pre-trained model that uses the target container image as an input, and acquire the empty target container wall image corresponding to the information about the target container and the capturing condition.

In this case, the acquisition unit 820 may, when the empty target container wall image corresponding to the target container and the capturing condition is not present, search for at least two empty container wall images that are most similar to the target container and the capturing condition among empty container wall images that are pre-constructed for container information and each capturing condition, and generate and acquire an empty target container wall image corresponding to the target container and the capturing condition using the at least two empty container wall images.

The generation unit 830 generates a difference image in which a wall background of the target container is removed based on the target container image and the empty target container wall image.

In this case, the generation unit 830 may correct the target container image using image information (e.g., a phantom image area) of the phantom included in the target container image and image information of a phantom constructed in advance, and generate the difference image using the corrected target container image and the empty target container wall image.

In this case, the generation unit 830 may correct the target container image such that the phantom image area included in the target container image has the same brightness distribution as a brightness distribution of a phantom image area constructed in advance.

The detection unit 840 may detect cargo in the target container based on the difference image.

In this case, the detection unit 840 may detect the type of cargo, for example, metal, an inorganic material, an organic material, and the like, and the location of cargo, from the difference image using a pre-trained learning model for detecting the type and location of cargo.

The display unit 850 displays cargo detection information, for example, the location and type of the cargo on the target container image or the difference image.

Although some parts are omitted in the description of the apparatus in FIG. 8, the apparatus according to the embodiment of the present disclosure may include all the content described in the method of FIGS. 1 to 7, which is obvious to those skilled in the art.

Figure 9:
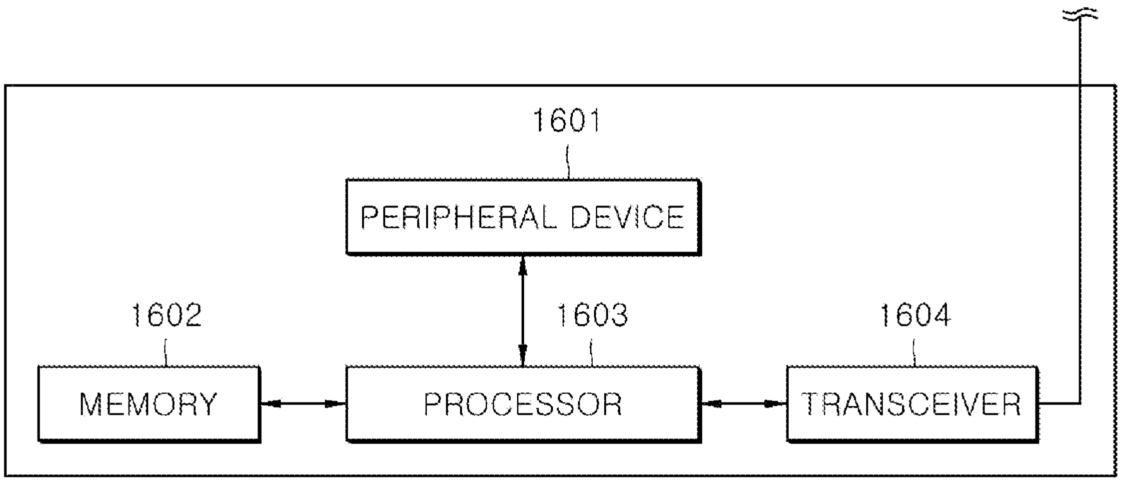
FIG. 9 is a block diagram illustrating a device to which an apparatus for detecting cargo in a backscatter X-ray container image according to another embodiment of the present disclosure is applied.

FIG. 9 is a block diagram illustrating a device to which an apparatus for detecting cargo in a backscatter X-ray container image according to another embodiment of the present disclosure is applied.

For example, an apparatus for detecting cargo in a backscatter X-ray container image according to another embodiment of the present disclosure of FIG. 8 may be a device 1600 shown in FIG. 9. Referring to FIG. 9, the device 1600 may include a memory 1602, a processor 1603, a transceiver 1604, and a peripheral device 1601. In addition, as an example, the device 1600 may further include other components, and is not limited to the above-described embodiment. In this case, the device 1600 may be, for example, a mobile user terminal (e.g., a smartphone, a laptop computer, a wearable device, etc.) or a fixed management device (e.g., a server, a personal computer (PC), etc.).

More specifically, the device 1600 shown in FIG. 9 may be an exemplary hardware/software architecture, such as a cargo detection device, a contraband detection device, a backscatter X-ray detection device, or the like. In this case, as an example, the memory 1602 may be a non-removable memory or a removable memory. In addition, as an example, the peripheral device 1601 may include a display, a Global Positioning System (GPS) device, or other peripheral devices, and is not limited to the above-described embodiment.

In addition, as an example, the device 1600 described above may include a communication circuit, such as the transceiver 1604, and based on the communication circuit, communication with an external device may be performed.

In addition, as an example, the processor 1603 may include at least one among a general purpose processor, a digital signal processor (DSP), a DSP core, a controller, a microcontroller, application specific integrated circuits (ASICs), field programmable gate array (FPGA) circuits, other types of integrated circuits (ICs), and one or more microprocessors associated with a state machine. That is, the processor 1603 may be a hardware/software configuration that performs a control role for controlling the device 1600 described above. In addition, the processor 1603 may modularize and perform the functions of the acquisition unit 820, the generation unit 830, and the detection unit 840 described above with reference to FIG. 8.

In this case, the processor 1603 may execute computer executable instructions that are stored in the memory 1602 to perform various required functions of the apparatus for detecting cargo in a backscatter X-ray container image. For example, the processor 1603 may control at least one of signal coding, data processing, power control, input/output processing, or communication operations. In addition, the processor 1603 may control a physical layer, a medium access control (MAC) layer, and application layers. In addition, as an example, the processor 1603 may perform authentication and security procedures in an access layer and/or an application layer, and is not limited to the above-described embodiment.

As an example, the processor 1603 may communicate with other devices through the transceiver 1604. For example, the processor 1603 may control an apparatus for detecting cargo in a backscatter X-ray container image to communicate with other devices via a network through execution of computer executable instructions. That is, the communication performed in the present disclosure may be controlled. For example, the transceiver 1604 may transmit radio frequency (RF) signals through an antenna and may transmit signals based on various communication networks.

In addition, as an example, a multi input multi output (MIMO) technology, beamforming, and the like may be employed as an antenna technology, which is not limited to the above-described embodiment. In addition, the signal transmitted and received through the transceiver 1604 may be modulated and demodulated and controlled by the processor 1603, and it is not limited to the above-described embodiment.

Exemplary methods of the disclosure are represented as a series of operations for clarity of description, but are not intended to limit the order in which operations are performed, and each operation may be performed simultaneously or in a different order as needed. In order to implement the method according to the present disclosure, the illustrative operations may additionally include other operations, include the remaining operations except for some operations, or include additional operations other than some operations.

The various embodiments of the disclosure are intended to describe representative aspects of the present disclosure rather than listing all possible combinations, and the matters described in the various embodiments may be applied independently or in combinations of two or more.

In addition, various embodiments of the present disclosure may be implemented by hardware, firmware, software, or a combination thereof. In the hardware implementation, the technology may be implemented in one or more of application specific integrated circuits (ASICs), digital signal processors (DSPs), digital signal processing devices (DSPDs), programmable logic devices (PLDs), field programmable gate arrays (FPGAs), processors (general processors), controllers, microcontrollers, microprocessors, etc.

The scope of the present disclosure includes software or machine-executable instructions (e.g., operating systems, applications, firmware, programs, etc.) that cause operations according to methods of various embodiments to be executed on a device or computer, and a non-transitory computer-readable medium in which such software, instructions or the like are stored and executable on a device or computer.

According to the present disclosure, a method and apparatus for detecting cargo in a container image for detecting cargo in an X-ray container image using a container wall background removal technique can be provided.

The effects of the present disclosure are not limited to the effects described above, and other effects that are not described will be clearly understood by those skilled in the art from the above detailed description.

What is claimed is:

1. A method of detecting cargo in a container image, the method comprising:

receiving a backscatter X-ray target container image captured on a target container, wherein the backscatter X-ray target container image includes backscatter signals reflected from a container wall of the target container and backscatter signals reflected from a cargo inside the container wall;

acquiring a backscatter X-ray empty target container wall image of an empty container that corresponds to the target container and a capturing condition of the backscatter X-ray target container image, wherein the backscatter X-ray empty target container wall image includes the backscatter signals reflected from the container wall of the target container without accommodating the cargo therein;

generating a difference image by removing a wall background caused by backscatter reflection from the container wall based on the backscatter X-ray target container image and the backscatter X-ray empty target container wall image; and detecting the cargo included in the target container based on the difference image, wherein the receiving includes additionally receiving the capturing condition including a geometric condition between the target container and an X-ray source and a geometric condition between the target container and an X-ray detector; and the acquiring of the backscatter X-ray empty target container wall image includes acquiring, as the backscatter X-ray empty target container wall image, an empty container wall image corresponding to information about the target container and the received capturing condition among empty container wall images that are pre-constructed for container information and each capturing condition.

2. The method of claim 1, wherein the acquiring of the backscatter X-ray empty target container wall image includes:

extracting a feature point for the target container through the backscatter X-ray target container image;

searching for empty container wall images corresponding to the information about the target container using the extracted feature point; and acquiring an empty container wall image corresponding to the capturing condition among the retrieved empty container wall images as the backscatter X-ray empty target container wall image.

3. The method of claim 1, wherein the acquiring of the backscatter X-ray empty target container wall image includes:

acquiring information about the target container and the capturing condition using artificial intelligence of a pre-trained model that uses the backscatter X-ray target container image as an input; and acquiring the backscatter X-ray empty target container wall image corresponding to the information about the target container and the capturing condition.

4. The method of claim 1, wherein:

the receiving includes receiving the backscatter X-ray target container image including the target container and a phantom installed in advance;

the generating of the difference image includes correcting the backscatter X-ray target container image using image information of the phantom included in the backscatter X-ray target container image and image information of the phantom constructed in advance, and generating the difference image using the corrected backscatter X-ray target container image and the backscatter X-ray empty target container wall image.

5. The method of claim 4, wherein the generating of the difference image includes correcting the backscatter X-ray target container image such that a brightness distribution of the phantom included in the backscatter X-ray target container image is the same as a brightness distribution of the phantom constructed in advance.

6. The method of claim 4, wherein the phantom is installed in a preset location of the target container or installed to be spaced apart from the target container.

7. The method of claim 1, wherein the acquiring of the backscatter X-ray empty target container wall image includes, when the backscatter X-ray empty target container wall image corresponding to the target container and the capturing condition is not present, searching for at least two empty container wall images that are most similar to the target container and the capturing condition among empty container wall images that are pre-constructed for container information and each capturing condition, and generating and acquiring the backscatter X-ray empty target container wall image corresponding to the target container and the capturing condition using the at least two empty container wall images.

8. The method of claim 1, wherein the receiving includes receiving a first backscatter X-ray target container image and a second backscatter X-ray target container image captured on the target container at a first wavelength and a second wavelength, respectively, the acquiring of the backscatter X-ray empty target container wall image includes acquiring a first backscatter X-ray empty target container wall image corresponding to the target container and a capturing condition of the first backscatter X-ray target container image, and a second backscatter X-ray empty target container wall image corresponding to the target container and a capturing condition of the second backscatter X-ray target container image, the generating of the difference image includes generating a first difference image of the first backscatter X-ray target container image and the first backscatter X-ray empty target container wall image and a second difference image of the second backscatter X-ray target container image and the second backscatter X-ray empty target container wall image, and the detecting of the cargo includes detecting the cargo based on the first difference image and the second difference image.

9. The method of claim 1, wherein the receiving includes receiving a first backscatter X-ray target container image and a second backscatter X-ray target container image captured on the target container at a first wavelength and a second wavelength, respectively, the acquiring of the backscatter X-ray empty target container wall image includes generating a third backscatter X-ray target container image of a third wavelength that is closest to the first wavelength and the second wavelength based on the first backscatter X-ray target container image and the second backscatter X-ray target container image, and acquiring a third backscatter X-ray empty target container wall image corresponding to the target container and a capturing condition including the third wavelength among pre-constructed empty container wall images, the generating of the difference image includes generating a third difference image of the third backscatter X-ray target container image and the third backscatter X-ray empty target container wall image, and the detecting of the cargo includes detecting the cargo based on the third difference image.

10. A method of detecting cargo in a container image, the method comprising:

receiving a backscatter X-ray target container image captured on a target container and a phantom installed at a preset location;

acquiring a backscatter X-ray empty target container wall image of an empty container that corresponds to the target container, the phantom, and a capturing condition of the backscatter X-ray target container image;

correcting the backscatter X-ray empty target container wall image using image information of the phantom included in the backscatter X-ray target container image and image information of the phantom included in the backscatter X-ray empty target container wall image;

generating a difference image, in which a wall background of the target container is removed, using the backscatter X-ray target container image and the corrected backscatter X-ray empty target container wall image; and detecting cargo included in the target container based on the difference image.

11. An apparatus for detecting cargo in a container image, the apparatus comprising:

a memory storing at least one instruction; and a processor configured to execute the at least one instruction stored in the memory, wherein the at least one instruction, when executed by the processor, causes the processor to:

receive a backscatter X-ray target container image captured on a target container, wherein the backscatter X-ray target container image includes backscatter signals reflected from a container wall of the target container and backscatter signals reflected from a cargo inside the container wall;

acquire a backscatter X-ray empty target container wall image of an empty container that corresponds to the target container and a capturing condition of the backscatter X-ray target container image, wherein the backscatter X-ray empty target container wall image includes the backscatter signals reflected from the container wall of the target container without accommodating the cargo therein;

generate a difference image by removing a wall background caused by backscatter reflection from the container wall based on the backscatter X-ray target container image and the backscatter X-ray empty target container wall image; and detect the cargo included in the target container based on the difference image, wherein the processor additionally receives the capturing condition including a geometric condition between the target container and an X-ray source and a geometric condition between the target container and an X-ray detector, and acquires, as the backscatter X-ray empty target container wall image, an empty container wall image corresponding to information about the target container and the received capturing condition among empty container wall images pre-constructed for container information and each capturing condition.

12. The apparatus of claim 11, wherein the processor:

extracts a feature point for the target container through the backscatter X-ray target container image;

searches for empty container wall images corresponding to the information about the target container using the extracted feature point; and acquires an empty container wall image corresponding to the capturing condition among the retrieved empty container wall images as the backscatter X-ray empty target container wall image.

13. The apparatus of claim 11, wherein the processor acquires information about the target container and the capturing condition using artificial intelligence of a pre-trained model that uses the backscatter X-ray target container image as an input, and acquires the backscatter X-ray empty target container wall image corresponding to the information about the target container and the capturing condition.

14. The apparatus of claim 11, wherein the processor:

receives the backscatter X-ray target container image including the target container and a phantom installed in advance, and corrects the backscatter X-ray target container image using image information of the phantom included in the backscatter X-ray target container image and image information of the phantom constructed in advance, and generates the difference image using the corrected backscatter X-ray target container image and the backscatter X-ray empty target container wall image.

15. The apparatus of claim 14, wherein the processor corrects the backscatter X-ray target container image such that a brightness distribution of the phantom included in the backscatter X-ray target container image is the same as a brightness distribution of the phantom constructed in advance.

16. The apparatus of claim 11, wherein the processor, when the backscatter X-ray empty target container wall image corresponding to the target container and the capturing condition is not present, searches for at least two empty container wall images that are most similar to the target container and the capturing condition among empty container wall images pre-constructed for container information and each capturing condition, and generates and acquires the backscatter X-ray empty target container wall image corresponding to the target container and the capturing condition using the at least two empty container wall images.

17. The apparatus of claim 11, wherein the processor:

receives a first backscatter X-ray target container image and a second backscatter X-ray target container image captured on the target container at a first wavelength and a second wavelength, respectively, acquires a first backscatter X-ray empty target container wall image corresponding to the target container and a capturing condition of the first backscatter X-ray target container image, and a second backscatter X-ray empty target container wall image corresponding to the target container and a capturing condition of the second backscatter X-ray target container image, generates a first difference image of the first backscatter X-ray target container image and the first backscatter X-ray empty target container wall image and a second difference image of the second backscatter X-ray target container image and the second backscatter X-ray empty target container wall image, and detects the cargo based on the first difference image and the second difference image.

18. The apparatus of claim 11, wherein the processor:

receives a first backscatter X-ray target container image and a second backscatter X-ray target container image captured on the target container at a first wavelength and a second wavelength, respectively, generates a third backscatter X-ray target container image of a third wavelength that is closest to the first wavelength and the second wavelength based on the first backscatter X-ray target container image and the second backscatter X-ray target container image, and acquires a third backscatter X-ray empty target container wall image corresponding to the target container and a capturing condition including the third wavelength among pre-constructed empty container wall images, generates a third difference image of the third backscatter X-ray target container image and the third backscatter X-ray empty target container wall image, and detects the cargo based on the third difference image.

* * * * *